July 5, 1932. A. B. CRAIG 1,865,839
DEVICE FOR THE TRANSMISSION OF MECHANICAL POWER
Original Filed Jan. 24, 1930 2 Sheets-Sheet 1
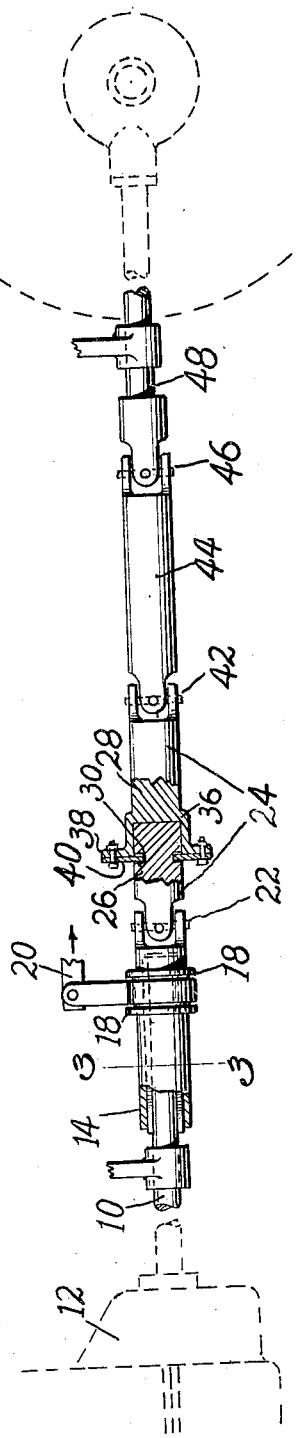
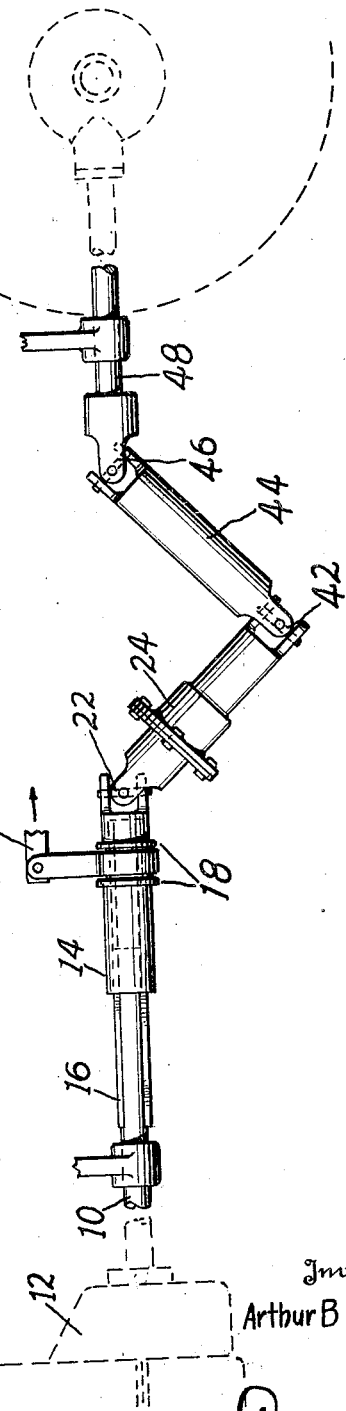
Inventor
Arthur B Craig

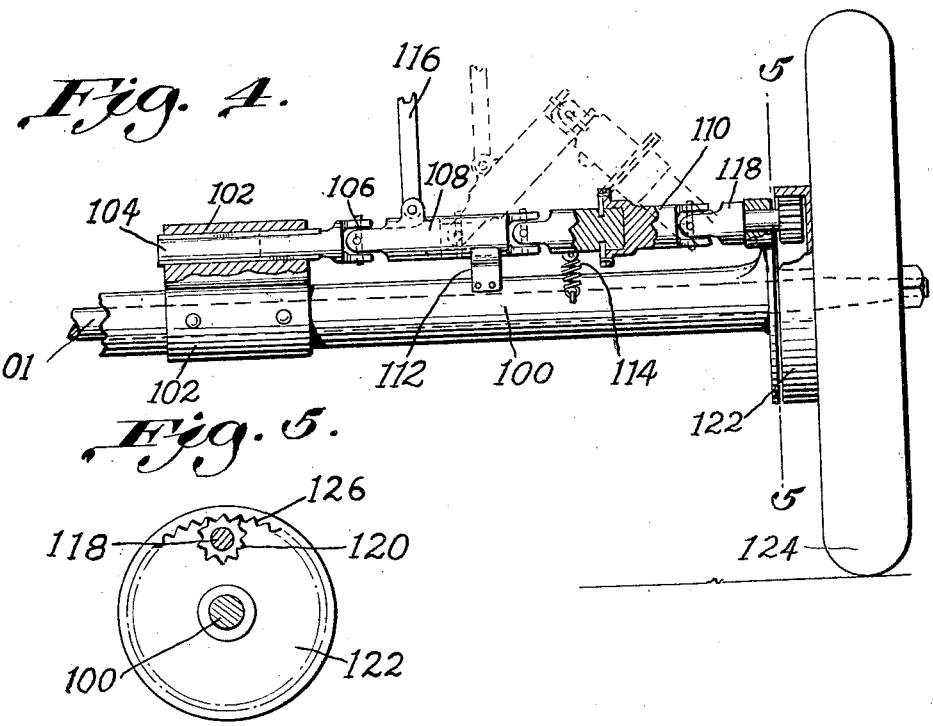
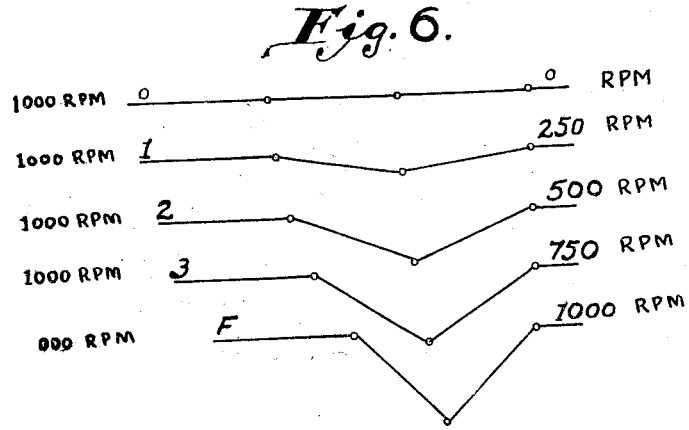

Patented July 5, 1932

1,865,839

UNITED STATES PATENT OFFICE

ARTHUR B. CRAIG, OF BETHESDA, MARYLAND

DEVICE FOR THE TRANSMISSION OF MECHANICAL POWER

Application filed January 24, 1930, Serial No. 423,154. Renewed March 30, 1932.

(GRANTED UNDER THE ACT OF MARCH 3, 1883, AS AMENDED APRIL 30, 1928; 370 O. G. 757)

This invention relates to a device for the transmission of mechanical power. More particularly the invention relates to a device for the transmission of mechanical power which enables the transmission of any desired degree of speed and power without the aid of the conventional gear and clutch arrangement.

One object of the invention is to provide a transmission device for mechanical power by means of which the speed and power of the driving shaft may be transmitted to the shaft to be driven without the use of a gear and clutch arrangement.

Another object of the invention is to provide a transmission device for mechanical power for transmitting speed and power from the driving shaft to the shaft to be driven in any desired degree.

Still another object of the invention is to provide a transmission device for mechanical power in which the speed and power of the driving shaft may be transmitted to the shaft to be driven without breaking the connection between the shafts.

Still further objects of the invention are to provide a device of the type mentioned which is simple in construction, inexpensive to manufacture, easy to operate and to repair, and taking less room and weighing less than the conventional power transmission devices.

These and other objects of the invention will become more readily apparent upon a reading of the specification in connection with the accompanying drawings and appended claims.

The device will be shown and described as applied to an automobile, although it is understood that it may be applied in any type of power transmission.

In the drawings:

Fig. 1 is a side elevation partially in section showing the device in a neutral position.

Fig. 2 is a side view of the device showing the device with certain of the members in a 45 degree position.

Fig. 3 is a cross sectional view on the line 3—3 of Fig. 1.

Fig. 4 shows a modification of the invention applied as an automobile brake, with parts in section.

Fig. 5 is a cross section view on the line 5—5 of Fig. 4.

Fig. 6 is a diagrammatical representation of the device showing the elements in various angular positions.

The device consists of a connecting shaft composed of the members 10, 24, 44, 48.

The drive shaft 10 is a continuation of the crank shaft of an automobile motor. The motor has been designated in the drawings by the reference numeral 12. Mounted on the drive shaft 10 so as to slide longitudinally thereon is a sleeve member 14. This sleeve member is keyed to the shaft 10 by means of ribs 16 which project longitudinally along the drive shaft and which engage with corresponding grooves on the inside of the sleeve member.

The sleeve member 14 is provided with a collar 18 mounted on its outer circumference. A manually operable lever 20 is provided with an end formed into a ring. This ring surrounds the collar 18 on the sleeve member. The lever 20 may be operated to effect a longitudinal movement of the sleeve member without interfering with the rotation thereof.

The end of the sleeve member 14 farthest from the motor 12 is connected by means of a universal joint 22 to a friction member generally designated as 24. This friction member is composed of a male member 26 and a female member 28.

The male member 26 is divided by means of a groove 30 into two portions. This groove travels the circumference of the male member and is positioned in a plane substantially at right angles to the axis of the member.

On one end of the female member 28 is an enlarged head 36. This enlarged head is provided with a cylindrical recess adapted to receive one end of the male member 26.

The enlarged head 36 of the female member is provided with a flange 38 to which is secured a ring 40 whose inner circumference projects inwardly beyond the inner periphery of the cylindrical recess to engage the groove 30 in the male member 26 and is concentric with the longitudinal axis of the female member. These members are constructed so as to permit a substantially free rotation of the male member within the cylindrical recess of the female members when the axes of the two members form a straight line.

The opposite end of female member from that which receives the male member is connected by means of a universal joint connection 42 to the member 44. The other end of this member 44 is connected by means of a universal joint connection 46 to the driven shaft 48.

The operation of the device will now be described.

The first representation marked 0 on the left in Fig. 6 is a diagrammatical representation of the members in a 180 degree position as shown in Fig. 1. In this position the lever 20 is positioned as far to the left as is possible. When the device is in this position no power is transmitted to the driven shaft 48, because the male member 26 rotates freely within the annular recess of the female member 28 and there is a maximum amount of slippage and a minimum amount of friction between the male member and the female member.

The second representation of Fig. 6 marked 1 on the left thereof diagrammatically shows the members 24 and 44 in a position to form slightly less than a 180 degree angle. This angle was formed by moving the lever 20 slightly to the right, thus shortening the distance between the end of the sleeve member 14 and the driven shaft 48. In this position there is still a considerable amount of slippage between the male and female members but because of the added effort of rotating the members 24 and 44 on their respective axes while in this position, some considerable friction is produced within the friction member. Due, however, to the great amount of slippage still present the driven shaft 48 will turn considerably slower than the driving shaft 10.

As the lever 20 is drawn to the right the positions represented in the diagram in Fig. 6 by the numbers 2 and 3 are reached. In each case, because of the increased difficulty encountered in turning the members 24 and 44 on their respective axis because of the increased angle, the amount of friction between the male and female members increases while the amount of slippage decreases. Thus, as the angle formed by the members 24 and 44 is increased by moving the lever 20 to the right, the greater becomes the power transmitted to the driven shaft 48.

When the lever 20 is moved to its extreme rightward position, the members 24 and 44 form a 90 degree angle. This is shown in the drawings in Fig. 2, and in Fig. 6 it is represented by that part of the diagram marked F.

When the members form substantially a 90 degree angle, it becomes impossible, on account of the universal joint connection 42 joining them, for these members to rotate on their respective axes. Both members become locked in the 90 degree position and in this position a rotating movement takes place, the axis of rotation being the imaginary line of the base of a triangle formed by the members. The axis is, in other words, the same as that of the major portion of the whole device.

In this position there is no friction or slippage between the male and female members, on account of the absence of and impossibility of any tendency of the members to rotate on their respective axes. The device in this position corresponds to high gear of the ordinary gear shift automobile. There being no slippage between the male and female members, the ratio of power transmission will be 1:1.

It is thus seen that by varying the angle formed by the members 24 and 44, the ratio of transmission may be increased or decreased in any desired degree.

As shown in Figs. 4 and 5 of the drawings, the device may be applied as an automobile brake.

The device used as a brake is mounted above the axle shaft of the automobile in the following manner:

Projecting from the axle casing 100 is a bracket 102 in which is securely mounted the shaft 104. The shaft is mounted in a horizontal position parallel to the axle casing 100, so as to prohibit a rotating of the shaft in the bracket, but so as to permit a longitudinal sliding of the shaft within the bracket. This may be accomplished by keying the shaft in the bracket.

This shaft member 104 is connected by means of a universal joint connection 106 to a shaft member 108 which is in turn connected to a friction member 110 similar to that shown in Fig. 1 and designated by the reference numeral 24. The friction member is also composed of male and female members.

When the device is in a normal position of 180 degrees, the member 108 rests upon a bracket 112 secured to the axle casing 100. A spring 114, connecting the friction member 110 and the axle casing 100, tends to keep the device in the 180 degree position.

The lever 116 is pivotally connected to the shaft member 108 and is manually operable to lift the members 108 and 110 so as to form angles varying from 180 degrees to 90 degrees.

The female portion of the friction member 110 is joined by a universal joint connection to a shaft 118. Securely mounted on this shaft so as to rotate therewith is a toothed wheel 120. A brake drum 122 is mounted on the inner side of the wheel 124 so as to rotate therewith, the wheel being carried by an axle 101. The inner circumference of the brake drum 122 is provided with teeth 126 for engaging the toothed wheel 120.

When the device is in an 180 degree position the shaft 118 rotates with the wheel 124, on account of the engagement of the toothed wheel 120 on the shaft 118 with the teeth 126 on the inner circumference of the brake drum 122. In the 180 degree position a great amount of slippage is present between the male and female portions of the friction member 110.

To apply brakeage in various degrees, the lever 116 is raised, thus throwing the members 108 and 110 in angular positions less than 180 degrees. As the angle formed by these members is decreased, the friction between the male and female portions of the friction member increases and the slippage decreases. When in substantially a 90 degree position, as shown by the dotted lines of Fig. 4, the members 108 and 110 become locked because of the universal joint connecting them and it becomes impossible for the wheel 124 to rotate.

While I have described one embodiment of my invention, I wish it to be understood that I do not intend to limit myself thereby except within the scope of the appended claims.

The invention herein described may be manufactured and used by or for the Government of the United States for governmental purposes without the payment to me of any royalty thereon or therefor.

Having now described my invention, what I claim as new and desire to secure by Letters Patent in the United States is:

1. A power transmission device, comprising a pair of shafts, means for rotating the first of said shafts, means for transmitting driving torque from said first shaft to the second shaft, including two jointed shaft sections intermediate and pivotally connecting said pair of shafts, one of said sections being formed of independently revoluble terminal portions, and means for holding said sections at an angle of said pair of shafts.

2. A power transmission device, comprising a driving shaft, a driven shaft, connections between said shafts including two shaft sections intermediate said driving and driven shafts, said sections being pivotally connected together at their adjacent ends and pivotally together at their opposite ends to said respective shafts, one of said sections having one of its ends freely revoluble in bearings provided in its remaining end and means for varying the angularity of said sections relative to said shafts, whereby the driving torque of the driven shaft may be varied without breaking the said connections.

3. A power transmission device, comprising a pair of axially aligned shafts, means for rotating the first of said shafts, a member feathered to and free to slide upon the second shaft, connections between the said shafts for varying the speed of the second shaft from none to maximum speed and comprising two jointed shaft sections pivotally connected together at their adjacent ends with one of their opposite ends pivotally connected to the first shaft and the other end pivotally connected to said member, and one of said sections having one of its ends non-longitudinal and freely revolubly mounted in its remaining end, and means for at will holding said sections in alignment with, or at, different angles of said shaft, whereby the driving torque of the second shaft may be varied from zero up without breaking the said connections.

4. A power transmission device, comprising a pair of axially aligned shafts, means for rotating the first of said shafts, a sleeve feathered to and slidable upon the first shaft with one of its ends projecting beyond the end of said shafts, connections between said shafts, including two shaft sections pivotally connected together at their adjacent ends with one of their terminals pivotally connected to the projecting end of said sleeve and the other pivotally connected to the second shaft, and one of said sections being formed of independently revoluble and relatively non-longitudinal movably aligned portions, means for at will holding said sections in alignment with said shafts or at variable angles to said shaft, whereby the driving torque of the second shaft may be varied without breaking the connections between the shafts.

5. In a device of the class described, a pair of axially aligned shafts, a connecting means consisting of an expansion device and two members joined together to said shafts by universal joints, one of said connecting members being formed of a friction member composed of revoluble male and female portions, and means for varying the angle formed by the members comprising the connecting member.

In testimony whereof I have hereunto set my signature.

ARTHUR B. CRAIG.